United States Patent [19]

Droche et al.

[11] Patent Number: 6,048,125
[45] Date of Patent: Apr. 11, 2000

[54] ARTICLE COMPRISING TWO ELEMENTS ARTICULATED RELATIVE TO ONE ANOTHER

[75] Inventors: Emile Droche, La Garenne Colombes; Eric Leverger, Epone; Olivier Dordet, Thoiry, all of France

[73] Assignee: I.T.W. de France, Beauchamp, France

[21] Appl. No.: 09/065,447

[22] Filed: Apr. 24, 1998

[30] Foreign Application Priority Data

Apr. 25, 1997 [FR] France .................................. 97 05139

[51] Int. Cl.$^7$ .................................................. B65D 25/32
[52] U.S. Cl. .............................. 403/12; 403/12; 403/111; 403/154; 16/444; 16/303
[58] Field of Search ................................ 403/11, 12, 111, 403/119, 157, 150, 161, 154; 16/444, 445, 303, 304

[56] References Cited

U.S. PATENT DOCUMENTS

| 1,440,713 | 1/1923 | Ausbourne . | |
|---|---|---|---|
| 3,082,473 | 3/1963 | West | 16/445 |
| 5,138,743 | 8/1992 | Hoffman | 16/303 |
| 5,461,755 | 10/1995 | Hardigg et al. | 16/444 X |
| 5,704,094 | 1/1998 | Hartigan et al. | 16/303 |
| 5,715,576 | 2/1998 | Liu | 16/303 X |
| 5,915,440 | 6/1999 | Repo | 16/303 X |

FOREIGN PATENT DOCUMENTS

| 0 523 359 | 1/1993 | European Pat. Off. . |
|---|---|---|
| 2 401 355 | 3/1979 | France . |
| 32 45 927 | 6/1984 | Germany . |
| 708 894 | 5/1954 | United Kingdom . |

OTHER PUBLICATIONS

Patent Abstract of JP 07 117545, filed May 9, 1995.

*Primary Examiner*—Lynne H. Browne
*Assistant Examiner*—David E. Bochna
*Attorney, Agent, or Firm*—Lowe Hauptman Gopstein Gilman & Berner

[57] ABSTRACT

An article includes an articulation pin (4) engaged in first and second elements (2,3A), to secure the same together, with a tongue and groove respectively formed in the elements and pin to prevent relative rotation. A blocking arrangement fixes the second element and the pin to prevent relative rotation when they are in a predefined relative axial and angular position. The first and second elements (2,3A) and also the pin (4) cooperate so that the application of a force between the first elements (2) and the second element (3A) at least equal to a predetermined threshold, when the pin (4) and the second element (3A) are in the predefined relative axial and angular position, produces a relative axial movement between the pin and the second element, freeing the blocking arrangement so that the pin is free to rotate in the second element.

21 Claims, 5 Drawing Sheets

ARTICLE COMPRISING TWO ELEMENTS ARTICULATED RELATIVE TO ONE ANOTHER

TECHNICAL FIELD

The invention relates to articles comprising two elements articulated relative to one another.

BACKGROUND OF THE INVENTION

Articles of this kind are known which can be put into one configuration wherein the two elements are temporarily held rigidly fixed relative to one another and which may be easily brought, from the configuration in which they are held in a rigid state, into a configuration in which the two elements are free to rotate relative to one another, the configuration in which they are held in a rigid state puffing, for example. The two elements in a relative position such that it is particularly easy to mount the article on the support which is meant to receive it, and the article being brought into the normal articulation configuration once the operation of mounting on the support has been completed.

SUMMARY OF THE INVENTION

For this purpose the invention provides an article comprising a first element and a second element articulated to one another, including:

an articulation pin engaged in the first element and in the second element;

the first element and the pin comprise means to fix them in rotation relative to one another;

the second element and the pin comprise blocking means to fix them in rotation relative to one another when the second element and the pin are in a predefined relative axial and angular position, and the first element, the second element and the pin are adapted to cooperate so that the exertion of a couple between the first element and the second element at least equal to a predetermined threshold, whilst the pin and the second element are in the said predefined relative axial and angular position, produces a relative axial movement between the pin and the second element freeing the blocking means so that the pin is free to rotate in the second element.

The action of passing from the maintenance in a rigid state configuration to the normal articulation configuration by a relative axial movement between the pin and the second element has the advantage of being simple to perform, because it suffices to provide that when a couple greater than a predetermined threshold is exerted between the first and second elements, the cooperation between the blocking means creates, by reaction between the pin and the second element, an axial force having the direction and strength required to produce the desired movement.

It will be noted that the invention makes it possible to perform the change to the normal articulation configuration without having to break a part of the article causing blocking in the maintenance in a rigid state configuration, thus eliminating the risk of undesirable effects which the fragment of the article which would be detached during the rupture might produce, in particular, interference with pivoting between the two elements or indeed, in a situation where it may be subject to vibrations, such as the passenger compartment of a vehicle, annoying noises.

In accordance with preferred characteristics enabling a simple, convenient and low cost implementation, one of the blocking means which the pin and the second element comprise is made of a softer material than that of which the other blocking means is made, so that the exertion of the said couple greater than a predetermined threshold deforms the blocking means made of a softer material in such a manner that a relative angular movement becomes possible between the pin and the second element comprising the blocking means made of the softer material and this provides an inclined ramp for the other blocking means thanks to which a relative angular movement between the pin and the second element produces a relative axial movement between them.

In accordance with other preferred characteristics, which meet the operating demands most often encountered in practice, the first element and the second element comprise means for mutual axial retention and the pin and the first element cooperate so as to allow a relative axial movement between them only when they are subjected to a relative axial force greater than a predetermined threshold.

Thus it is the pin (and not the second element) which is displaced relative to the first element, because means are present for maintaining the relative axial positions of the first and second elements.

Of course, the threshold which must be at least reached by the couple exerted between the first and second elements, to make them pass from the maintenance in a rigid state configuration, directly corresponds to the threshold which the axial force between the second element and the pin must exceed in order for there to be a relative axial movement between the latter.

Preferably, for simplicity and cost reasons, the pin is engaged squeezed tightly in the first element.

In accordance with other preferred characteristics, for security reasons the pin and the first element comprise means for preventing the pin disengaging from the first element.

Preferably, for practical manufacturing reasons:

the first element and the pin comprise, respectively, a groove and a tongue to fix them in rotation relative to one another and/or the pin comprises a shank, a head located at one end of the shank, a stud projecting from the shank and a tongue projecting from the shank and orientated in an axial direction, the tongue being narrower than the stud and extending between the head and the stud.

It will be seen that the invention is particularly suitable for articles comprising a return spring for driving the first element and the second element angularly relative to one another in a predetermined direction, where the angular path between the first and second elements comprises a relative position limit to which the said spring drives the said article, and where the said obstacle means holds the article, against the force of the spring, in an angular position at a distance from the said limit position; and more particularly, when the first element is formed by a pivotable handle and the article comprises two second elements each formed by a plate to be fixed on the frame of the vehicle, where the said fixing plates are each disposed at one respective end of the handle, each plate co-operating in a similar manner with the handle.

BRIEF DESCRIPTION OF THE DRAWINGS

The invention will now be explained by the following description of an embodiment, given by way of non-limiting example, with reference to the attached Figures in which.

DETAILED DESCRIPTION OF THE INVENTION

Figure 1:
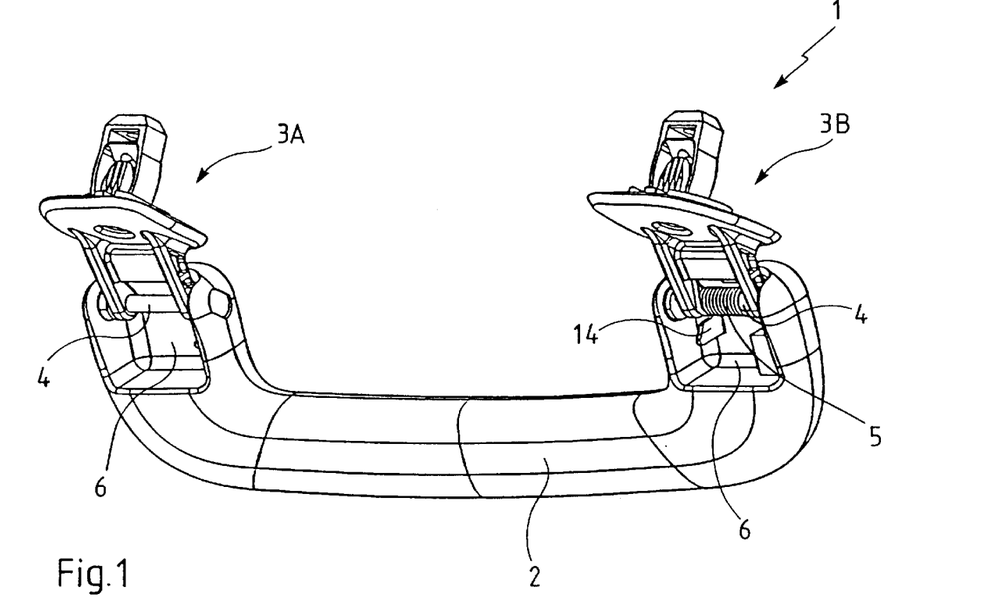
FIG. 1 is a perspective view of an article in accordance with the invention, comprising a pivotable handle for an automotive vehicle and two fixing plates on which the handle is articulated, at one end and the other respectively, the said article being mounted in a configuration in which the handle is rigidly held to each of the plates in an angular position in which the handle is lowered relative to the plates.
Figure 8:
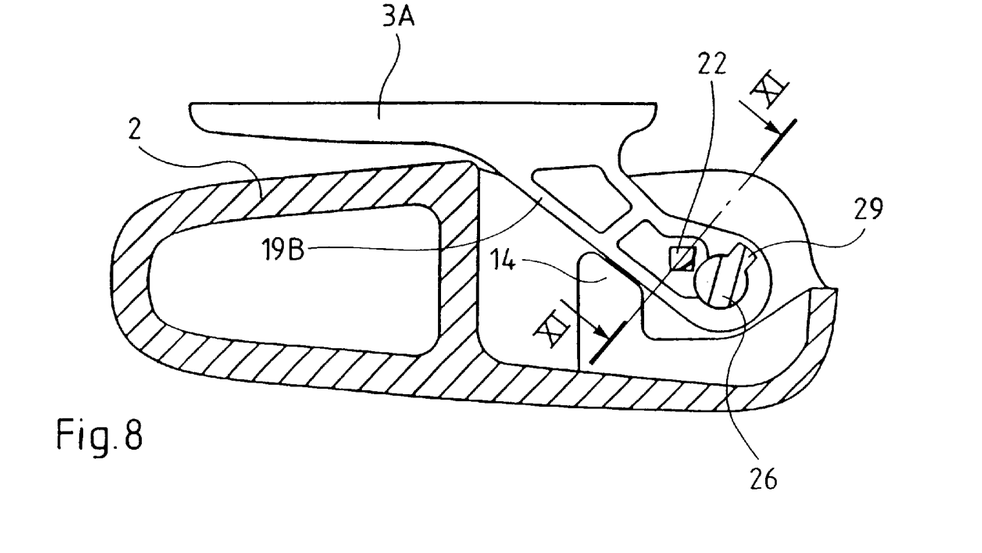
FIG. 8 is a similar view to that in FIG. 7 but with the handle pivoted relative to the plate, the obstructing means provided on the pin and on the plate having been freed.

The article 1 shown in FIG. 1 comprises a pivoting handle 2, two fixing plates 3A and 3B on which the handle 2 is articulated by its end which is seen at the left in FIG. 1 and by that seen at the right, respectively, two articulation pins 4, each engaged in the handle 2 and in the plate 3A and in the plate 3B, respectively, and two coiled springs 5, of which only that on the right is shown, each disposed around a respective pin 4 and each bearing on the one hand on the handle 2 and on the other hand on the plate 3A or 3B to drive them towards the relative angular limit position opposite to that shown in FIG. 1, in other words towards the position of minimum bulk shown in FIG. 8, in which the handle is raised relative to the plates 3A and 3B.

Generally speaking, the right and left halves of article 1 are symmetrical, i.e., mirror images of one another. The details for only one of the sides of article 1 follows.

Figure 2:
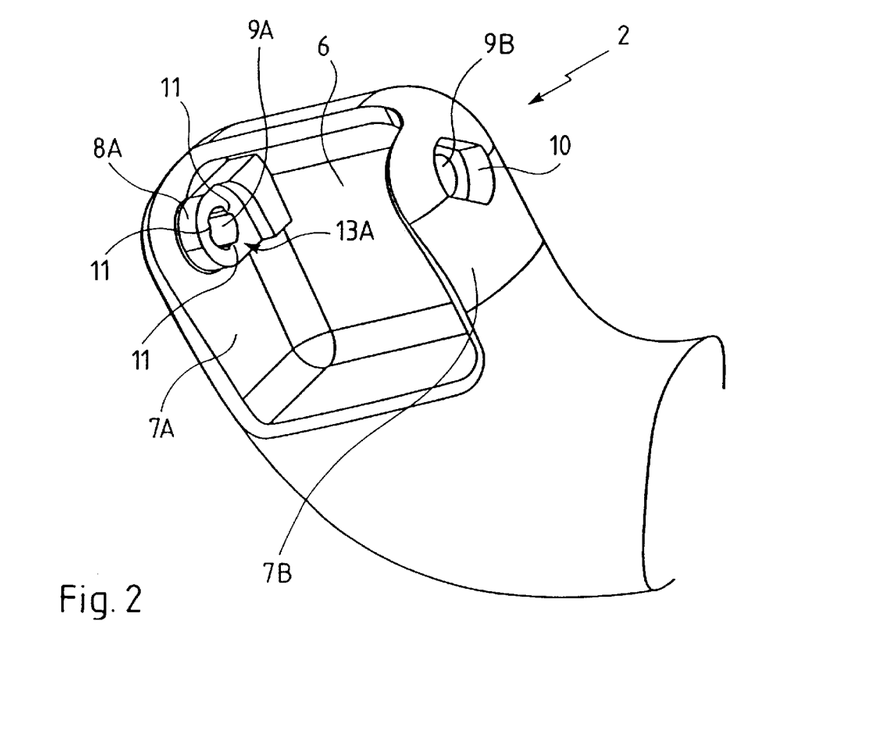
FIGS. 2 and 3 are perspective views of the end of the handle which is seen at the left in FIG. 1, the view in FIG. 2 being seen substantially at the same angle as the view in FIG. 1, whereas the view in FIG. 3 makes it possible to see the interior side of the other lateral wall of the hollow end of the handle.
Figure 3:
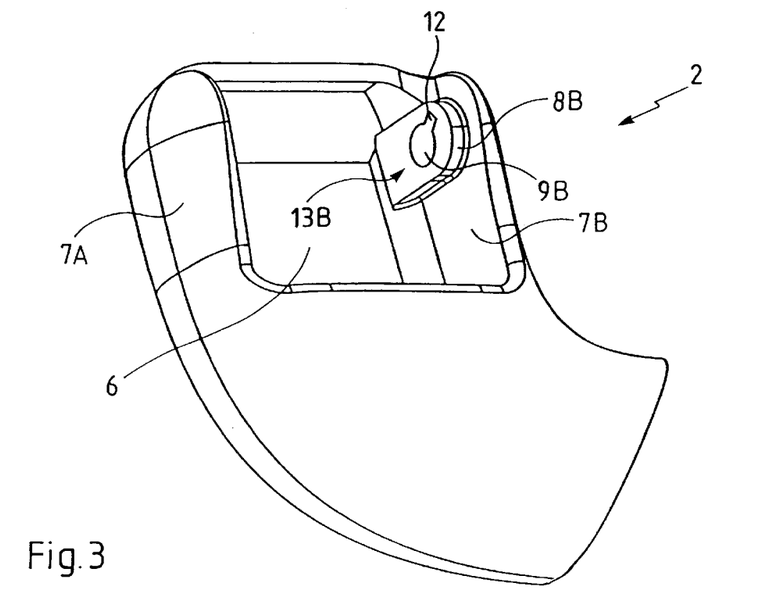
Figure 4:
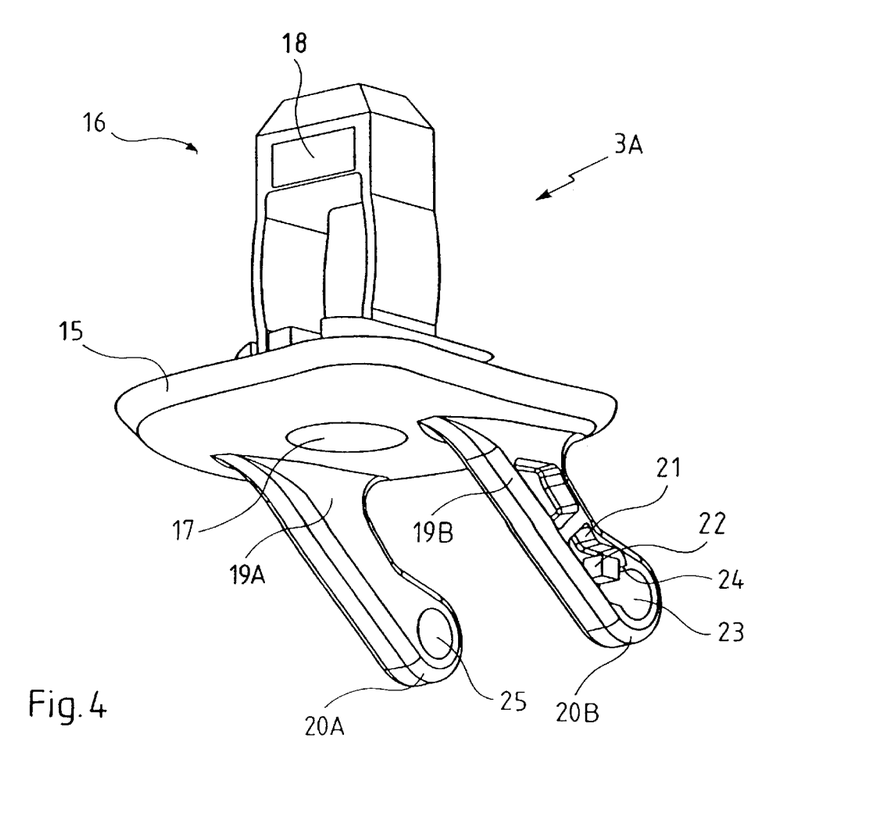
FIG. 4 is a perspective view of the fixing plate which is shown on the left in FIG. 1.
Figure 9:
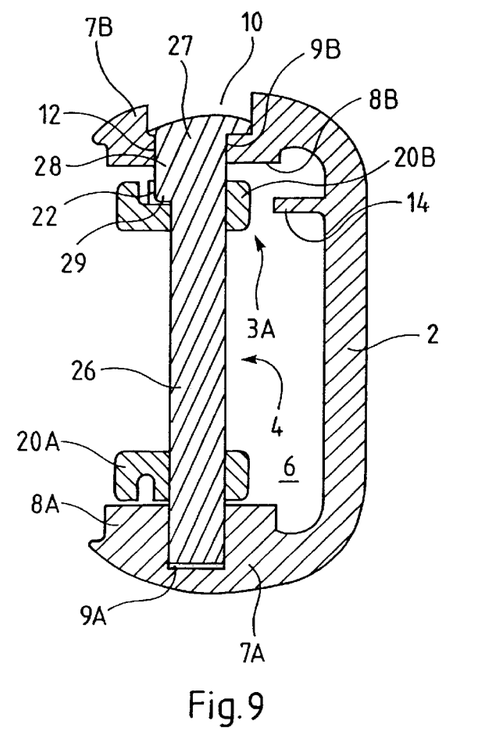
FIG. 9 is the view in the plane marked IX—IX in FIG. 7.

The handle 2 is moulded in one piece from plastic. It comprises at each end a recess 6 delimiting two opposite lateral walls, 7A on the outer side and 7B on the inner side respectively. As can be seen particularly in FIGS. 2, 3 and 9, each of the walls 7A and 7B is equipped with a respective projection 8A and 8B projecting into the recess 6. A blind bore 9A opening into the recess 6 is made in the projection 8A and in part of the thickness of the wall 7A. A through bore 9B is made in the wall 7B and in the projection 8B, which opens on the one side into the recess 6 and on the other side into a countersunk region 10 made in the wall 7B.

The profile of the bore 9A is substantially circular in shape with three small projecting thicknesses 11 (FIG. 2) which have a substantially axial orientation.

The profile of the bore 9B is substantially circular in shape with a groove 12 (FIG. 3) which has a substantially axial orientation.

As will be seen below, the surfaces 13A and 13B respectively of the projections 8A and 8B which face one another, act as axial limit stop surfaces for the plate articulated at that end of the handle.

A lug 14 (not shown in the recess 6 which can be seen at the left in FIGS. 1 to 3 and 6) extends projecting from the rear wall of the recess 6, so as to define the position of minimum bulk of the article 6 (handle raised) in which one of the legs of the plate 3A or 3B comes to bear against the end of the lug 14, as shown in FIG. 8.

The plate 3A, just like the plate 3B, is moulded in a single piece from plastic and comprises a base 15 from which extends, on the side seen on top in FIGS. 1, 4 and 6 to 8, a fixing foot 16 designed to be introduced through a hole made in the wall on which it is intended to mount the article 1, the foot 16 being designed to bear against the said wall, the fixing on which is performed by deformation of the foot 16 by means of a screw (not shown) the head of which co-operates with the base 15 and the shank of which passes through the hole 17 in the latter, between the legs of the foot 16 until it engages with a nut (not shown) inserted in the housing 18 in the foot 16. For fuller details of the fixing device with which the plate 3A is equipped, reference can be made to the claims French patents 78.33799 and 96.14367 assigned to I.T.W. DE FRANCE.

On the side opposite to the fixing foot 16, the plate 15 bears two articulation legs 19A and 19B, each having a free end constituting an articulation bearing, 20A and 20B respectively.

Each of the legs 19A and 19B comprises on the outer side a recess 21 which extends to about half of its thickness. The recess 21 in the leg 19B comprises a projecting stud 22 which has a rectangular profile and which is located right at the edge of the bore 23 in the bearing 20B, a thin plate 24 separating the recess 21 from the bore 23 on the side which is seen on the right of the stud 22 in FIG. 4, whilst the recess 21 communicates directly with the bore on the side which can be seen below the stud in FIG. 4.

The recess made on the outer side of the leg 19A is similar to the recess 21 in the leg 19B but does not comprise a projecting stud 22 and does not extend as far as the bore 25 in the bearing 20A, so that the lateral wall of the bore is present through the entire thickness of the leg 19A.

Figure 5:
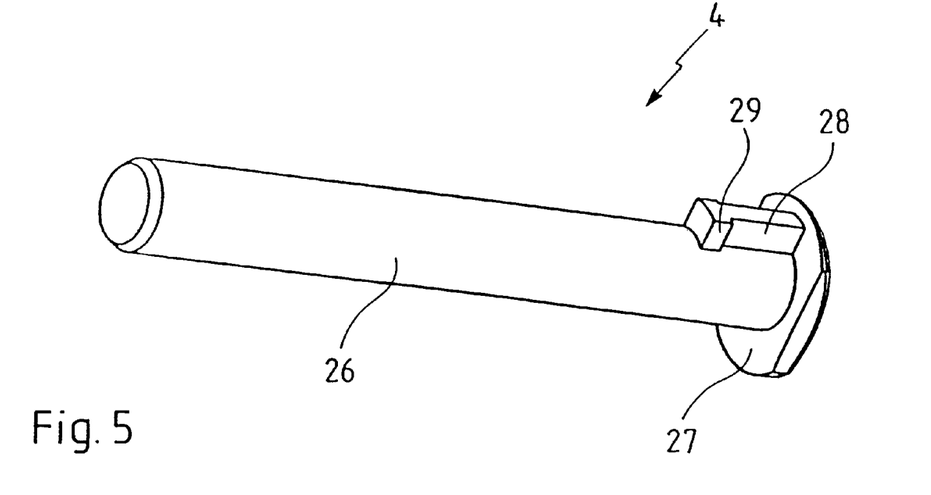
FIG. 5 is a perspective view of the pin which serves to articulate the handle and one or other of its fixing plates.
Figure 6:
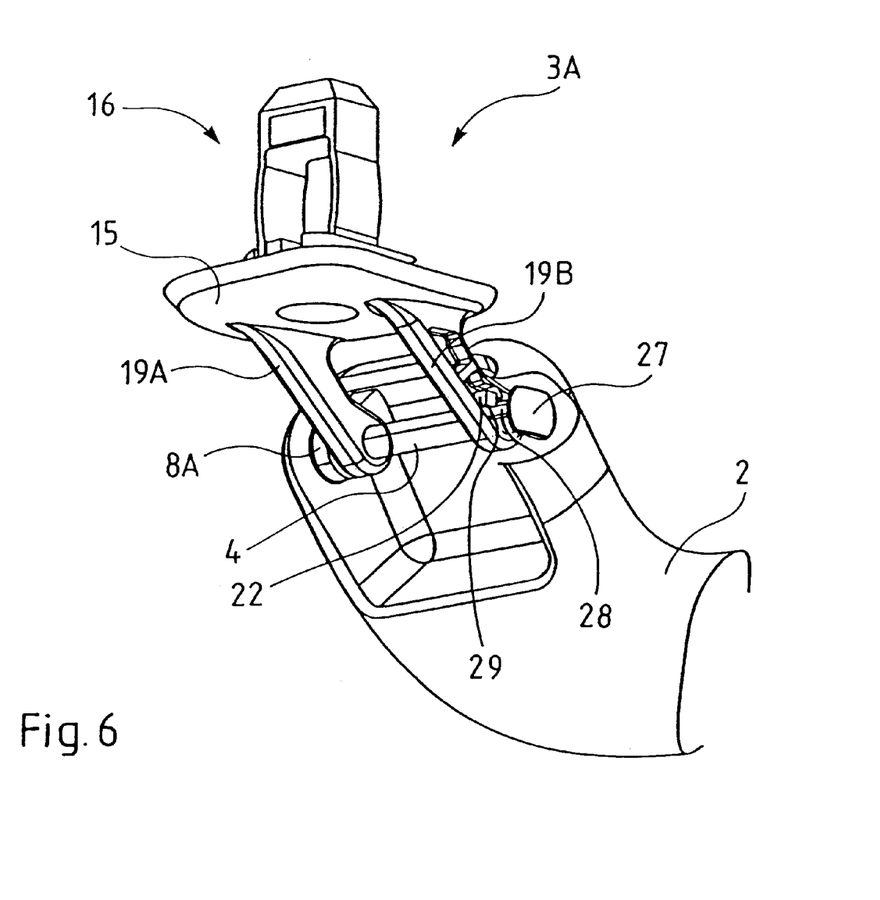
FIG. 6 is a perspective view of the end of the article which is seen on the left in FIG. 1, partially cut away, allowing the cooperation between the handle, the pin and the plate to be seen.
Figure 7:
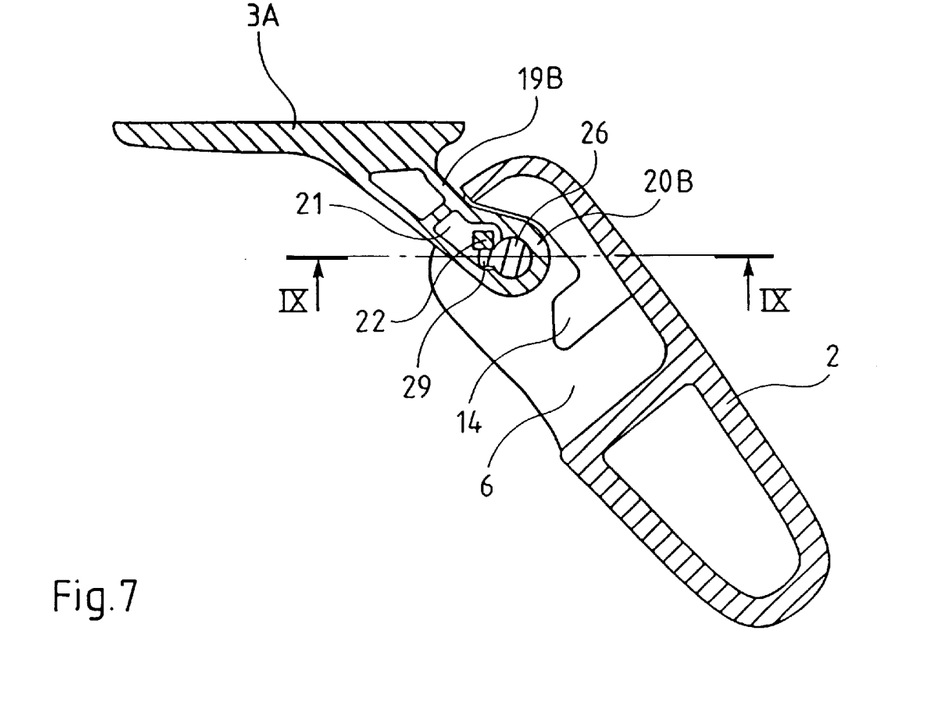
FIG. 7 is a view in elevation of a cross-section of the article made at the level of the articulation leg of the plate seen on the right in FIG. 6.

The pin 4 is made of plastic, moulded in a single piece, and is harder than the material of the handle 2 and of the material of the plates 3A and 3B. As can be seen most particularly in FIG. 5, the pin 4 comprises a cylindrical shank 26 with a circular cross-section, a head 27 which is situated at one end of the shank 26, and a tongue 28 projecting relative to the shank 26, having a substantially axial orientation, and the tongue 28 extending over a defined length from the head 27 as far as a stud 29 having the same height as the tongue 28 but wider.

The diameter of the shank 26 corresponds to that of the bores 23 and 25 in the plate 3A or 3B, so that the pin can turn freely in the plate.

The diameter of the shank 26 also corresponds to that of the bores 9A and 9B in the handle 2, whilst the width and the height of the tongue 28 correspond to those of the groove 12 in the bore 9B. Although it is wider, the stud 29 can be forced through the groove 12 without damaging the latter, because the pin 4 is made of harder material than the handle 2. The shape of the head 27 corresponds exactly to that of the countersunk region 10 of the handle 2 which is provided to receive the head 27.

It can be seen that it is possible to engage the pin 4 in the handle 2 by arranging the pin 4 and the bores 9A and 9B coaxially, with the distal end of the shank 26 facing the countersunk region 10, then engaging the shank in the countersunk region 10, in the bore 9B and finally in the bore 9A, then exerting a sufficient axial pressure on the head 27 to make the shank 26 continue to penetrate into the bore 9A and to make the stud 29 pass through the groove 12 as well as to engage the head in the countersunk region 10.

When the pin 4 has been completely pushed in, the tongue 28 is located in the groove 12 and the stud 29 is located beyond the latter, in other words in the recess 6.

The cooperation between the handle 2 and the pin 4 means that the latter is engaged lightly squeezed in the handle. It is therefore necessary to exert a certain axial force to move it in the opposite direction to the insertion, this withdrawal movement being possible until the stud 29 comes to abut against the surface 13B of the projection 8B. The said abutment of the stud 29 on the projection 8B prevents the pin 4 disengaging from the handle 2, the axial withdrawal force which would allow the stud 29 to pass through the groove 12 again being greater than the forces encountered in practice.

To engage the pin 4 in the plate 3A or 3B, the pin 4 is arranged coaxially with the bores 23 and 25, with the distal end of the shank 26 facing the outer side of the bore 23, then the shank 26 is inserted in the bore 23 and then in the bore 25. The stud 29 is designed to be of a size such that if the pin 4 is pushed completely in with regard to the plate 3A or 3B, the stud 29 can engage exactly in the space which can be seen below the stud 22 in FIG. 4, the cooperation of the stud 29, the stud 22 and the wall of the recess 21 opposite the latter ensuring that the pin and the plate are fixed in rotation relative to one another.

An explanation will now be given as to how the article 1 is fitted so that it is assembled and held in the rigid state configuration shown in FIG. 1.

Use is made, in fact, of an assembling procedure which makes it possible to position the handle 2, the plates 3A and 3B, and also the springs 5 as shown in FIG. 1. Thus a pin 4 is engaged, as explained previously, in each end of the handle 2, each pin being also engaged 3A or in the plate 3B and also in the centre of one of the springs 5. At the end of the insertion movement, each pin 4 is fixed in rotation relative to the handle 2, because of the cooperation of the tongue 28 and the groove 12, and also fixed in rotation relative to the plate 3A or the plate 3B, because of the cooperation of the studs 22 and 29, so that in the end the handle 2 and the plates 3A and 3B are held rigidly fixed to one another.

Figure 11:
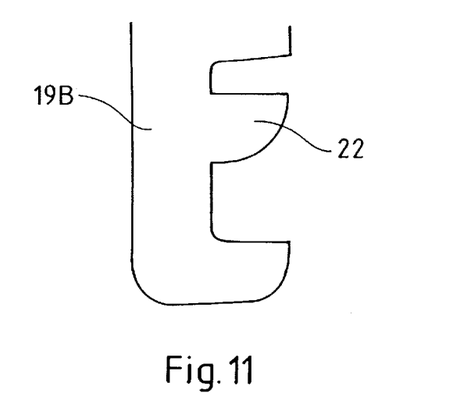
FIGS. 11 and 12 are partial views of cross-sections made in the leg of the plate along the plane marked XI—XI in FIG. 8, showing the alteration in shape of the obstructing stud by plastic deformation and tilting, respectively.
Figure 12:
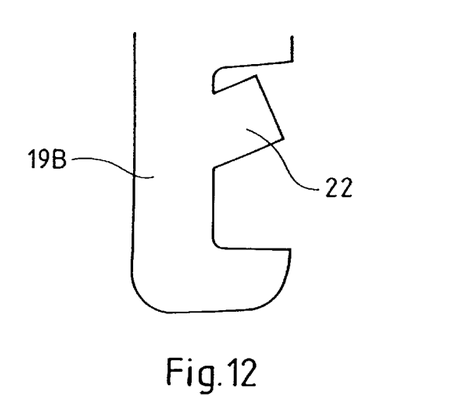

If a sufficiently large force is exerted between the handle 2 and one or other of the plates 3A and 3B, in the direction in which the handle is raised to come into the position shown in FIG. 8, the shape of the stud 22 becomes changed by plastic deformation (FIG. 11) or by tilting (FIG. 12), or by a combination of the two, given that the material of the stud 29 is harder than that of the stud 22.

Figure 10:
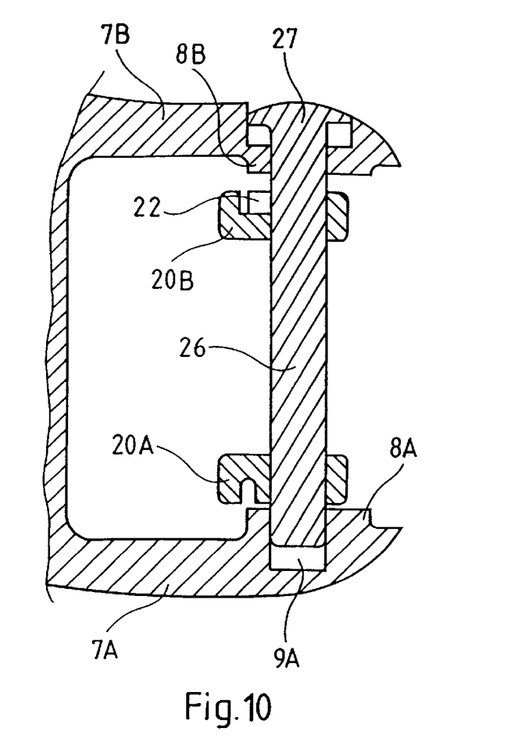
FIG. 10 is a similar view to FIG. 9, after the respective obstructing means have been freed.

As a result of this deformation it becomes possible to turn the pin 4 in the plate 3A or 3B, the said angular movement causing by reaction between the studs 22 and 29 an axial force between the pin 4 and the plate 3A or 3B. Because the bearing 20A of the plate comes to bear against the surface 13A of the projection 8A, no axial movement is possible between the handle and the plate, so that the pin 4 is moved axially in the withdrawal direction until the stud 29 is completely disengaged from the stud 22 (see FIGS. 9 and 10).

The handle 2 may then be turned freely relative to the plates 3A and 3B and, in the absence of a driving force, the springs 5 bring the handle back against the plate 3A or 3B in the position of minimum bulk shown in FIG. 8.

In practice, article 1 is supplied to the operator who has to fit it on a vehicle body in the rigid configuration shown in FIG. 1, which allows him to install the feet 16 of the plates 3A and 3B easily into the holes provided to receive them, then to turn the screw which enables fixing to be effected.

Once the two plates are fixed, the operator exerts a force to make the handle turn in the direction in which it is raised, the two pins then move axially to the required extent and the handle 2 is then free to turn relative to the plates 3A and 3B. The mounting of the article 1 on the vehicle is then completed.

It will be seen that the spacing between the two respective outer surfaces of the bearings 20A and 20B is smaller than the distance separating the surfaces 13A and 13B of the projections 8A and 8B. This makes it possible to have a certain tolerance in the spacing between the holes in the vehicle in which the respective feet 16 of the plates 3A and 3B must be inserted, but the play is insufficient to allow the studs 22 and 29 to disengage except when the pin 4 has undergone an axial withdrawal movement.

In alternative embodiments which are not shown, the toes 11 which act to clamp the shank 26 in relation to the handle 2 are not present, the clamping being obtained directly over the totality of the cylindrical surface; the head 27 and the countersunk region 10 are completely circular instead of comprising flat portions, or alternatively they have yet another shape.

In other not shown alternatives, the two articulated elements are something other than a pivoting handle and a fixing plate; the play is sufficient between the first and the second articulated element for there to be no need for the pin to perform an axial withdrawal movement; or alternatively it is the material of which the obstruction means on the plate is made which is harder than that used to make the obstruction means on the pin.

Numerous other alternatives are possible depending on the circumstances, and it will be remembered in this respect that the invention is not limited to the embodiments described and shown.

We claim:

1. An article comprising:

a first and a second element articulated to one another;

an articulation pin (4) engaged in the first element (2) and in the second element (3A,3B);

a fixing arrangement (12,28) extending between the first element (2) and the pin (4) for fixing the first element (2) and the pin (4) relative to one another;

a blocking arrangement (22,29) extending between the second element and the pin for fixing the second element (3A,3B) and the pin (4) relative to one another when the second element (3A,3B) and the pin (4) are in a predefined relative axial and angular position, and the first element (2), the second element (3A,3B) and the pin (4) are adapted to cooperate so that application of a force between the first element (2) and the second element (3A,3B) at least equal to a predetermined threshold, while the pin (4) and the second element (3A,3B) are in said predefined relative axial and angular position, produces a relative axial movement between the pin and the second element to free the blocking arrangement so that the pin (4) is free to rotate in the second element (3A,3B) wherein the blocking arrangement includes a first blocking arrangement and a second blocking arrangement, the first blocking arrangement being made of a softer material than a material forming said second blocking arrangement (29) wherein application of said force greater than the predetermined threshold deforms the first blocking arrangement (22) made of the softer material in such a manner that relative angular movement occurs between the pin (4) and the second element (3A,3B) by providing an inclined ramp to enable the second blocking arrangement (29) to move past the first blocking arrangement.

2. An article according to claim 1, wherein the pin (4) and the first element (2) are structured to allow relative axial movement therebetween only when subjected to a relative axial force greater than the predetermined threshold.

3. An article according to claim 1, wherein the pin (4) is engaged tightly in the first element (2).

4. An article according to claim 1, wherein the pin (4) and the first element (2) comprise means (12,29) for preventing the pin disengaging from the first element.

5. An article according to claim 1, wherein the first element (2) and the pin (4) respectively include a groove (12) and a tongue (28) to fix them in rotation relative to one another.

6. An article according to claim 1, wherein the pin (4) comprises a shank (26), a head (27) located at one end of the shank (26), a stud (29) projecting from the shank and a tongue (28) projecting from the shank and orientated in an axial direction, the tongue being narrower than the stud (29) and extending between the head and the stud, the stud forming a part of the blocking arrangement.

7. An article according to claim 1, wherein the pin (4), the first element (2) and the second element (3A,3B) are each made of plastic moulded as single pieces respectively, the material of the pin (4) being harder than that of the second element (3A,3B).

8. An article comprising:
a first and a second element articulated to one another;
an articulation pin (4) engaged in the first element (2) and in the second element (3A,3B);
a fixing arrangement (12,28) extending between the first element (2) and the pin (4) for fixing the first element (2) and the pin (4) relative to one another;
a blocking arrangement (22,29) extending between the second element and the pin for fixing the second element (3A,3B) and the pin (4) relative to one another when the second element (3A,3B) and the pin (4) are in a predefined relative axial and angular position, and
the first element (2), the second element (3A,3B) and the pin (4) are adapted to cooperate so that application of a force between the first element (2) and the second element (3A,3B) at least equal to a predetermined threshold, while the pin (4) and the second element (3A,3B) are in said predefined relative axial and angular position, produces a relative axial movement between the pin and the second element to free the blocking arrangement so that the pin (4) is free to rotate in the second element (3A,3B), further comprising a return spring to drive the first element (2) and the second element (3A,3B) angularly relative to one another in a predetermined direction, wherein the angular travel between the first and the second elements is limited with a relative limit position towards which said spring drives said article and wherein said blocking arrangement (22,29) holds the article against the force of the spring in a relative angular position distant from said limit position.

9. An article according to claim 8, wherein the pin (4) and the first element (2) are structured to allow relative axial movement therebetween only when subjected to a relative axial force greater than a predetermined threshold.

10. An article according to claim 8, wherein the pin (4) is engaged tightly in the first element (2).

11. An article according to claim 8, wherein the pin (4) and the first element (2) comprise means (12,29) for preventing the pin disengaging from the first element.

12. An article according to claim 8, wherein the first element (2) and the pin (4) respectively include a groove (12) and a tongue (28) to fix them in rotation relative to one another.

13. An article according to claim 8, wherein the pin (4) comprises a shank (26), a head (27) located at one end of the shank (26), a stud (29) projecting from the shank and a tongue (28) projecting from the shank and orientated in an axial direction, the tongue being narrower than the stud (29) and extending between the head and the stud, the stud forming a part of the blocking arrangement.

14. An article according to claim 8, wherein the pin (4), the first element (2) and the second element (3A,3B) are each made of plastic moulded as single pieces respectively, the material of the pin (4) being harder than that of the second element (3A,3B).

15. An article comprising:
a first and a second element articulated to one another;
an articulation pin (4) engaged in the first element (2) and in the second element (3A,3B);
a fixing arrangement (12,28) extending between the first element (2) and the pin (4) for fixing the first element (2) and the pin (4) relative to one another;
a blocking arrangement (22,29) extending between the second element and the pin for fixing the second element (3A,3B) and the pin (4) relative to one another when the second element (3A,3B) and the pin (4) are in a predefined relative axial and angular position, and
the first element (2), the second element (3A,3B) and the pin (4) are adapted to cooperate so that application of a force between the first element (2) and the second element (3A,3B) at least equal to a predetermined threshold, while the pin (4) and the second element (3A,3B) are in said predefined relative axial and angular position, produces a relative axial movement between the pin and the second element to free the blocking arrangement so that the pin (4) is free to rotate in the second element (3A,3B) wherein the first element is formed by a pivoting handle (2) of a vehicle and said article further comprises two said second elements each formed by a plate (3A,3B) for fixing the article to the body of the vehicle, said fixing plates each being located at one respective end of the handle and each plate co-operating in a similar manner with the handle.

16. An article according to claim 10, wherein the pin (4) and the first element (2) are structured to allow relative axial movement therebetween only when subjected to a relative axial force greater than a predetermined threshold.

17. An article according to claim 15, wherein the pin (4) is engaged tightly in the first element (2).

18. An article according to claim 15, wherein the pin (4) and the first element (2) comprise means (12,29) for preventing the pin disengaging from the first element.

19. An article according to claim 15, wherein the first element (2) and the pin (4) respectively include a groove (12) and a tongue (28) to fix them in rotation relative to one another.

20. An article according to claim 15, wherein the pin (4) comprises a shank (26), a head (27) located at one end of the shank (26), a stud (29) projecting from the shank and a tongue (28) projecting from the shank and orientated in an axial direction, the tongue being narrower than the stud (29) and extending between the head and the stud, the stud forming a part of the blocking arrangement.

21. An article according to claim 15, wherein the pin (4), the first element (2) and the second element (3A,3B) are each made of plastic moulded as single pieces respectively, the material of the pin (4) being harder than that of the second element (3A,3B).

\* \* \* \* \*